May 6, 1969     F. PAGANO     3,443,183
REGULATED THREE-PHASE ASYNCHRONOUS ELECTRIC MOTORS
Filed Nov. 25, 1966     Sheet 1 of 2

INVENTOR
FERNANDO PAGANO
BY
ATTORNEY

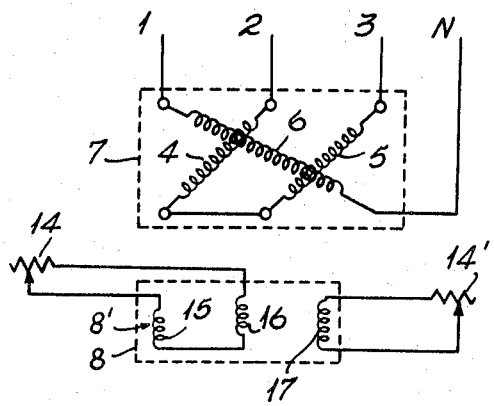
FIG. 4
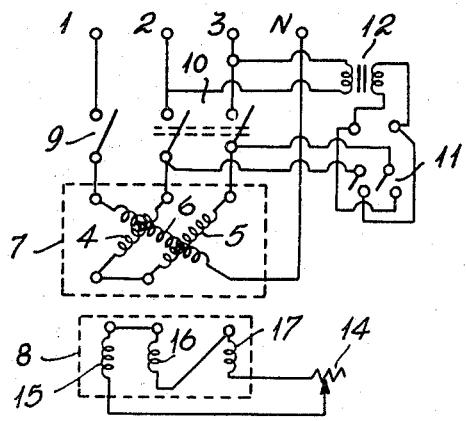
FIG. 5
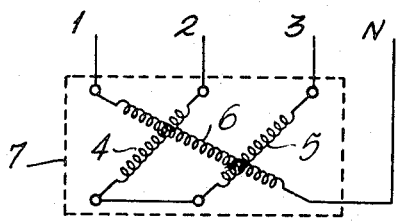
FIG. 6
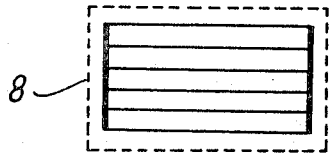

United States Patent Office 3,443,183
Patented May 6, 1969

3,443,183
REGULATED THREE-PHASE ASYNCHRONOUS ELECTRIC MOTORS
Fernando Pagano, M.T. de Alvear 2210,
Ciudadela, Buenos Aires, Argentina
Continuation-in-part of application Ser. No. 376,542,
June 19, 1964. This application Nov. 25, 1966, Ser.
No. 596,906
Int. Cl. H02k 17/02
U.S. Cl. 318—222     14 Claims

ABSTRACT OF THE DISCLOSURE

A regulated, three-phase, four wire, asynchronous electric motor including means for inducing a current in the neutral conductor whereby speed and braking regulation of said motor is achieved.

---

The present invention relates in general terms to alternating current electric motors and in particular to a three-phase asynchronous electric motor for energization from a four wire three-phase power supply and is a continuation in part application of my copending application Ser. No. 376,542, now abandoned.

It is well known in the art that the main problems which arise with alternating current electric motors are in connection with the starting and speed control and regulation thereof. Basically there are two types of three-phase electric motors; a first type comprising a short circuited rotor (Squirrel cage) and a second type having a wound rotor and accordingly requiring the use of slip rings. In the first type it has so far been virtually impossible to obtain any speed variation or regulation characteristic although it is possible to start this type of motor without great difficulty.

The second type, on the other hand, requires a somewhat complicated arrangement for starting purposes (switches for commuting the wound rotor from the "Y" or star connection to the delta connection) while speed regulation may be achieved by connecting in series therewith an external variable resistance which enables the operator to vary the current circulating in the windings of the rotor while, in order to vary the speed it is necessary to vary the number of poles of the motor and this is a rather cumbersome procedure and not entirely satisfactory as the speed of the rotor depends also on the frequency of the power supply.

In view of this none of these types of electric motors have been useful for all purposes, as is apparent from the great quantity of connections that have been proposed in the past and which satisfy either one or another of the required characteristics, but which do not generally provide an all purpose motor; it is for this reason that where speed variation is required, resource is necessary to direct current electric motors.

It has been experimentally proved that if the rotor and/or stator windings of an asynchronous electric motor are designed to fulfill certain requirements and if they are connected in a particular way, both of which will be later described, the speed of the rotating field of the stator can be made equal to the speed of rotation of the rotor, and accordingly, under these conditions it is possible for the rotor to achieve the speed of synchronism.

It is therefore the main object of the present invention to provide a three-phase asynchronous electric motor providing uniform speed variation between a few revolutions per minute up to the speed of synchronism.

It is a further object of this invention to provide a three-phase asynchonous electric motor particularly useful for example in elevators where certain characteristics of speed, acceleration and braking must be fulfilled.

A still further object of this invention is to provide a three-phase asynchronous electric motor, the speed of which may be controlled by varying the impedance of the stator or the rotor circuits.

An even further object of this invention is to provide a three-phase asynchronous electric motor providing excellent speed variation and acceleration characteristics without having to unbalance the currents in the three-phases of the three-phase power supply.

Before dealing with the specific details of this invention, it should be noted that when reference is made to a balanced condition in the three-phase power system, basically this is to be interpreted as meaning that equal currents circulate in each one of the four conductors connecting the stator to the power supply.

In a three conductor three-phase system, work is required to overcome the natural resistance created by the interaction of the three-phases of the system while in the three-phase four conductor arrangement all the work introduced in the system may be utilized and accordingly a higher efficiency is obtained.

In order to facilitate the comprehension of the present invention, references will now be made, by way of example, to the accompanying drawings, wherein like references correspond to like or equivalent parts and wherein:

FIG. 4 is a circuit diagram of the rotor and stator windings, wherein the rotor includes only one winding which has been subdivided into two independent electric circuits, each connected to a variable resistor for speed control and braking purposes.

FIG. 5 is a circuit diagram of the rotor and stator windings wherein the stator has been represented as connected to an additional power source, also for speed control and braking purposes, while the rotor is in closed circuit relationship with an external resistor.

FIG. 6 is a circuit diagram of another alternative embodiment of the invention but including a "squirrel cage" rotor.

Before dealing with the specific features of this invention it is believed convenient to divide the possible alternative embodiments into two groups. The first group of novel electric motors according to this invention are of the type having a rotor comprising a series of closed electric loops (squirrel cage); while the second group have wound rotors. Those electric motors which fall within this second group may have a rotor including three dephased windings connected in series or else six windings connected in two groups of three windings, each one of these groups having its three windings dephased in 120° and connected in series.

It has been stated above, that the stator and/or rotor may comprise three dephased windings, it is not believed necessary to further explain this point, as it is well known in the art that the windings of a three phase asynchronous electric motor must be dephased in 120° about the circumference of the rotor and/or stator. Furthermore, it is not believed necessary to describe in detail the connection of the wound rotor to the slip rings and their association to external circuit components, such as resistors, as this relationship is achieved by utilizing means well known to those skilled in the art.

It is to be noted that some of the specific connections which are to be now described have not been theoretically proved correct although I have carried out the experiments indicated and, I have tested the different embodiments, and the results hereinafter described are true ones.

Dealing now with the different embodiments illustrated in FIGS. 1 to 5 these correspond to the aforementioned second group, that is to say those comprising a wound rotor.

Figure 1:
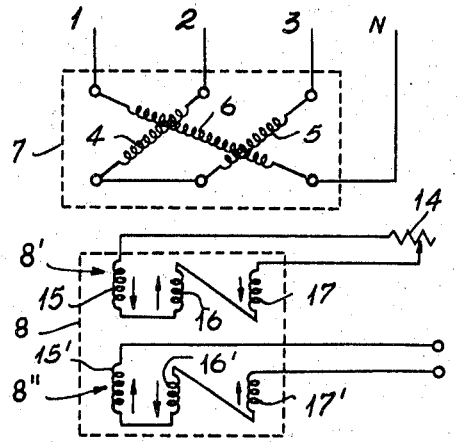
FIG. 1 is a circuit diagram of the rotor and stator windings, and wherein the rotor is illustrated as having two electrically insulated windings, one of which is in open circuit while the other is in closed circuit relationship with a variable resistor.

FIG. 1 is a circuit diagram of the three-phase asynchronous electric motor for energization from a four wire three-phase power supply (not illustrated) and comprises a stator 7 (schematically illustrated) including a primary compound winding 4–5 adapted to be connected to two phases 2, 3 of said four conductor three-phase power supply and a primary simple winding 6 adapted to be connected between the remaining phase 1 of said power supply and the neutral conductor N thereof.

Primary compound winding 4–5 comprises two windings 4 and 5 connected in series.

It is to be noted that the word "primary" is used in association, in the specification and claims, with the stator of this electric motor, due to its behaviour which is analogous to that of the primary winding of an electric transformer. Similarly the word "secondary" is used in association with the rotor of the novel electric motor.

The electric motor schematically represented in FIG. 1 also includes a rotor 8 comprising six windings 15, 16, 17, 15', 16', 17' connected in two groups 8', 8" of three windings, each one of these groups having its three windings connected in series.

Group 8' is connected in closed circuit relationship with an external resistor 14 to be used for starting the motor and for speed regulation as is known in the art. Group 8" remains in open circuit.

In FIG. 1 there is illustrated beside each winding of the rotor, an arrow corresponding thereto. These arrows represent the preferred phase connection of each one of the windings, although it is to be noted that satisfactory results have been obtained even if the different rotor windings are connected all in the same direction. In other words in FIG. 1 the secondary windings have been illustrated as if connected so that the potential difference thereacross increases in two of the windings and decreases in the third when the circuit is followed in a predetermined direction, although this is not indispensable. It can therefore be said that the compound winding and the simple winding can be connected in opposite, or the same phase relationship.

Each one of these groups 8', 8" is connected in opposite phase relationship one with respect to the other as is represented by the arrows corresponding to analogous windings 15 and 15'; 16 and 16', and 17, 17'. In this way, if both groups 8' and 8" were to be connected to external resistors of identical values, on connecting the motor to the power supply, each group would tend to drag the rotor in a direction opposite to the other. By varying the value of the external resistor of one or both windings one can be made to exert a larger effect than the other, in a predetermined direction. In this way the speed of the rotor may be controlled as desired, and what is more, if one of the groups is connected to an external power supply a positive braking effect can be provided.

In general, the windings 15, 16, 17 composing group 8' are dephased 30° with respect to the windings 15', 16', 17' of group 8" although it is interesting to note that if the windings of group 8' are superposed to those of group 8" in such a way that the turns of one winding of one group are oriented in opposite direction to the turns of the other winding of the other group (in other words to define for example two superimposed U's facing in opposite directions), on connecting the motor to the power supply, independently of the external resistance connected, the motor behaves as if it had a short circuited rotor (squirrel cage), it being possible to directly eliminate the external resistance connected to each winding without affecting in any way the behaviour of the motor.

The present invention is also applicable to a motor having a short circuited rotor as will be explained in more detail further on, in connection with FIG. 6.

In order to obtain the best results as far as speed control and regulations are concerned, it has been experimentally proved that if said primary simple winding 6 has the same number of turns as each winding 4 and 5 of said primary compound winding then the turns ratio of one of the windings 15 or 16 of said secondary compound winding of each group 8', 8" to said secondary simple winding of each group 8', 8" should be comprised between 1.33 and 0.66. With the described connection and turns ratio, the speed of the rotor is controlled by means of resistor 14.

It is interesting to note that even if group 8" is in open circuit its presence is desirable if good results are to be obtained as surprisingly, its elimination adversely affects the properties of the motor. These adverse effects although undesirable, are not of a fundamental nature and accordingly group 8" could be eliminated for certain requirements if the motor does not need to work under large loads as much power is lost thereby.

It has also been experimentally proved that if the number of turns of windings 15, 16, 17 and 15', 16' and 17' are made the same, that the same optimum results as far as speed control and regulation are concerned can be achieved if the turns ratio of the primary simple winding 6 to one of the windings of said primary compound winding 4,5 is comprised between 0.66 and 1.33. In this case, and in the event that the rotor should include only group 8', when the value of resistor 14 is equal to zero, the rotor will operate as a squirrel cage. Accordingly the rotor will virtually comprise a series of closed electric loops.

Figure 2:
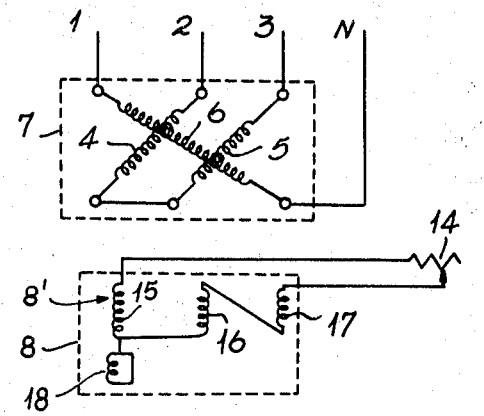
FIG. 2 is a circuit diagram of the rotor and stator windings, wherein the rotor includes only one independent winding in closed circuit with a variable resistor, and a short circuited winding connected thereto.

Referring now to FIG. 2, therein is illustrated another possible alternative embodiment which includes a stator 7 connected in the same way as the stator of the embodiment illustrated in FIG. 1 and which has a rotor 8 having only one group of windings 15, 16, 17 connected in closed circuit relationship with a resistor 14. As far as the turns ratio are concerned, the embodiment illustrated in this figure is entirely similar to that of FIG. 1.

Basically the difference resides in that a short circuited additional winding 18 is included in the rotor. This winding serves to maintain the energy of the rotor when the current therein is reduced to very low values. This reduction of the current in the rotor is often brought on when low speeds are desired, this causing the slip between the stator magnetic field and the rotor to increase. Winding 18 acts as a small "squirrel cage" which due to the increased slip helps to raise the speed of the rotor.

Figure 3:
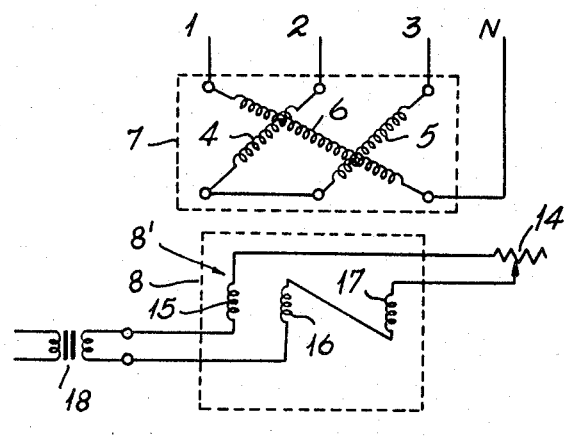
FIG. 3 is a circuit diagram of the rotor and stator windings, wherein the rotor winding is connected in closed circuit with a variable resistor; an external power source for speed control and braking purposes being also illustrated.

Referring now to FIG. 3 therein is illustrated an embodiment similar to that of FIG. 1 but wherein windings 15 and 16 are connected in series through an external power source 18 such as for example a magnetic amplifier. With this addition a very effective drive for elevators is obtained, the power source 18 serving in the acceleration and braking of the motor. In this embodiment the turns ratio indicated in connection with the embodiment of FIG. 1 also apply.

Dealing now with FIG. 4, the connection herein illustrated has proved in practice to be of utmost interest as the range of speed achieved by varying the values of the resistors associated with the windings of the rotor is enormous. In this particular case, the compound winding and the simple winding of the rotor are not connected in series but are electrically independent.

Windings 15 and 16 forming the secondary compound winding are connected in series with a first external resistor 14 while winding 17 constituting secondary simple winding is connected in series with a second external resistor 14'.

In this embodiment the turns ratio indicated with reference to the previous embodiments also apply and afford the best results.

The motor will now be further described with reference to FIG. 5, as far as starting, and speed control and regulation thereof are concerned.

The stator 7 of the motor comprises a primary compound winding 4, 5 connected to phases 2 and 3 of a three-phase power supply through a first switch 10, and a primary simple winding 6 connected to phase 1 through switch 9 and directly to the neutral conductor N. Phases 2 and 3 are connected to the primary winding of a transformer 12, the secondary winding of which is connected through a selector switch 11 to the primary compound winding 4, 5. As may be seen from FIG. 5, selector switch 11 enables the operator to invert the phase connections of the primary compound winding in order to apply a counter-phased voltage for reverse rotation. The rotor 8 of the electric motor is entirely similar to those previously described.

For the embodiment illustrated in FIG. 5, the same alternative turns ratios apply for the primary and secondary simple and compound windings.

In operation, in order to start the motor it is necessary to simultaneously close switches 9 and 10 (which under certain circumstances may be only one). The value of resistor 14 is slowly decreased and surprisingly, when the value thereof reaches zero, the rotor of the motor reaches the speed of synchronism. For speed variations, resistor 14 provides an ample range from a few turns per minute up to the speed of synchronism.

In some particular applications such as traction motors for electric trains, and elevators, the load under certain operating conditions tends to accelerate the rotor, while in others it tends to brake it. In this last event, the braking effect required must necessarily be achieved by applying a driving effect in the opposite direction to that of forward running, in order to avoid that the load dominate over the loss of speed. This effect may be achieved as follows:

Supposing that the motor is running with the value of resistor 14 equal to zero, switch 10 is opened and selector switch 11 is swung over in order to apply to compound primary winding 4, 5 a voltage oppositely phased to the one previously applied thereto, which produces the required braking effect due the change of magnetic field created by the new connection of the stator.

Referring now to FIG. 6 therein is schematically represented an electric motor having a stator 7 similar to those previously described but with a short circuited rotor 8 commonly known as a "squirrel cage" rotor and which comprises a series of closed electric loops.

This embodiment corresponds to the first group previously defined.

In this case, the stator also comprises a primary compound winding 4, 5 and a primary simple winding 6, each of these windings, similarly to the embodiments previously described, are adapted to be connected to two phases of a four conductor three phase power supply, and to the remaining phase of said power supply and the neutral conductor thereof respectively. In connection with the turns ratio of said primary simple winding to one of the windings of said primary compound winding, this is to be comprised between 0.66 and 1.33 if satisfactory results as far as speed control and regulation are concerned.

It thas been experimentally proved that these values depend on the number of magnetic poles defined by the windings of the stator.

In order to vary the speed of this motor, it is for example necessary to vary the voltage applied to the primary compound winding while the voltage of the primary simple winding remains constant.

The expression "closed electric loops" used in the specification and claims is to be interpreted as referring not only to the embodiment including a short-circuited rotor, but also to those having a wound rotor, inasmuch as in the case of a motor having a wound rotor, the electric loops of the windings can be considered as being magnetically closed, if it is borne in mind that this is a fundamental requirement for the rotor to operate.

I claim:

1. A three-phase asynchronous electric motor for energization from a four wire three phase power supply including a neutral conductor comprising: a rotor; a series of closed electric loops in said rotor; a stator; a primary compound winding in said stator connected to two phases of said four conductor three phase power supply; and a primary simple winding connected between the remaining phase of said power supply and the neutral conductor thereof, said primary compound winding including two series connected windings having the same number of turns, the turns ratio of said primary simple winding to one of the windings of said primary compound winding being comprised between 1 and 1.33.

2. A three-phase asynchronous electric motor for energization from a four wire three phase power supply including a neutral conductor comprising: a rotor; a series of closed electric loops in said rotor; a stator; a primary compound winding connected to two phases of said four conductor three phase power supply; and a primary simple winding connected between the remaining phase of said power supply and the neutral conductor thereof, said primary compound winding including two series connected windings having the same number of turns, the turns ratio of said primary simple winding to one of the windings of said primary compound winding being comprised between 0.66 and 1.

3. A three-phase asynchronous electric motor for energization from a four wire three phase power supply including a neutral conductor comprising: a rotor; a secondary compound winding in said rotor, said compound winding including two series connected windings and a secondary simple winding connected in series and in closed circuit relationship therewith; a stator, said stator including a primary compound winding having two series connected windings adapted to be connected to two phases of said four conductor three-phase power supply and a primary simple winding adapted to be connected between the remaining phase of said power supply and the neutral conductor thereof, said primary simple winding of said stator having the same number of turns as each winding of said primary compound winding, while the turns ratio of one of the windings of said secondary compound winding of said rotor to said secondary simple winding of said rotor being comprised between 1.33 and 0.66.

4. A three-phase asynchronous electric motor as claimed in claim 3, wherein said secondary compound winding of said rotor and said secondary simple winding of said rotor are connected in opposite phase relationship.

5. A three-phase asynchronous electric motor as claimed in claim 3, comprising an external resistance connected in series with said secondary windings of said secondary compound winding in said rotor.

6. A three-phase asynchronous electric motor as claimed in claim 3, wherein said rotor includes a short circuited additional winding connected to said secondary windings.

7. A three-phase asynchronous electric motor as claimed in claim 5, comprising an external power source connected in series with said secondary windings in said rotor and said external resistance.

8. A three-phase asynchronous electric motor as claimed in claim 3, wherein said rotor also includes a further secondary compound winding having two series connected windings and a further secondary simple winding connected in series therewith but in open circuit relationship, the turns ratio of one of the windings of this secondary compound winding to said secondary simple winding being comprised between 1.33 and 0.66.

9. A three-phase asynchronous electric motor for energization from a four wire three-phase power supply including a neutral conductor comprising: a secondary compound winding in said rotor, said secondary compound winding comprising two series connected windings and a secondary simple winding connected in series therewith and in closed circuit relationship, each of the windings of said secondary compound winding having the same number of turns as said secondary simple winding; a rotor and a stator, said stator including a primary compound winding having two series connected windings adapted to be connected to two phases of said four conductor three-phase power supply and a primary simple winding adapted to be connected between the remaining phase of said power supply and the neutral conductor thereof, the turns ratio of said primary simple winding to one of the windings of said primary compound winding being comprised between 0.66 and 1.33.

10. A three-phase asynchronous electric motor as claimed in claim 9, wherein said rotor also includes a further secondary compound winding having two series connected windings and a further secondary simple winding connected in series therewith but in open circuit relationship, each of the windings of said secondary compound winding having the same number of turns as said secondary simple winding.

11. A three-phase asynchonous electric motor as claimed in claim 9, wherein an external resistance is connected in series with said secondary windings.

12. A three-phase asynchronous electric motor as claimed in claim 9, wherein said rotor includes a short circuited additional winding connected to said secondary windings.

13. A three-phase asynchronous electric motor as claimed in claim 9, wherein an external power source is connected in series with said secondary windings and said external resistance.

14. A three-phase asynchronous electric motor for energization from a four wire three-phase power supply including a neutral conductor comprising: a rotor; a secondary compound winding in said rotor, said secondary compound winding having two windings connected in series and in closed circuit relationship with a first external resistor and an electrically independent secondary simple winding connected in series and in closed circuit relationship with a second external relationship with a second external resistor; and a stator, said stator including a primary compound winding having two series connected windings adapted to be connected to two phases of said four conductor three phase power supply and a primary simple winding adapted to be connected between the remaining phase of said power supply and the neutral conductor thereof, said primary simple winding of said stator having the same number of turns as each winding of said primary compound winding of said stator, while the turns ratio of one of the windings of said secondary compound winding of said rotor to said secondary simple winding of said rotor being comprised between 1.33 and 0.66.

References Cited

UNITED STATES PATENTS 2,805,308   9/1957   Hurlburt _____ 318—218 X

ORIS L. RADER, *Primary Examiner.*

G. Z. RUBINSON, *Assisitant Examiner.*

U.S. Cl. X.R.

310—198, 225